(No Model.)
F. G. TREHARNE.
INSULATOR AND INSULATING CONDUIT OR TUBING FOR ELECTRICAL PURPOSES.
No. 580,628. Patented Apr. 13, 1897.
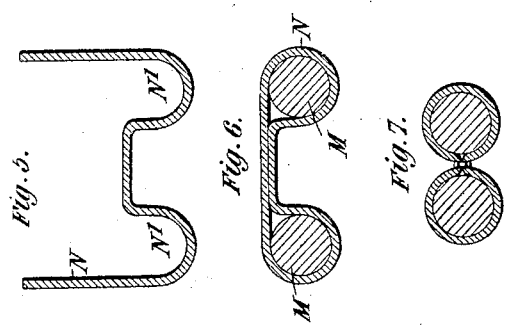
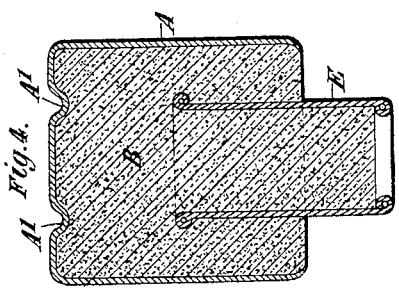
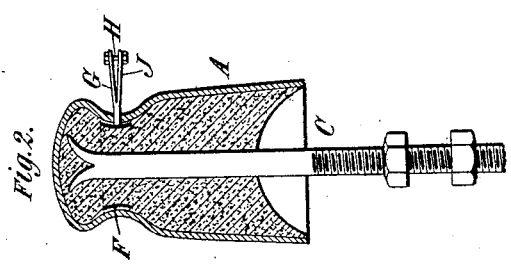
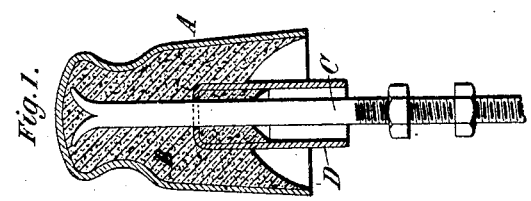
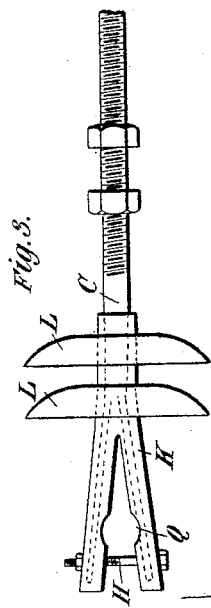
Witnesses:
Inventor:
Frederick Gwilym Treharne,
By his Attorney,
Horace Pettit.

UNITED STATES PATENT OFFICE.

FREDERICK GWILYM TREHARNE, OF LLANISHEN, ENGLAND.

INSULATOR AND INSULATING CONDUIT OR TUBING FOR ELECTRICAL PURPOSES.

SPECIFICATION forming part of Letters Patent No. 580,628, dated April 13, 1897.

Application filed October 28, 1896. Serial No. 610,326. (No model.)

*To all whom it may concern:*

Be it known that I, FREDERICK GWILYM TREHARNE, analytical chemist, a subject of the Queen of Great Britain, residing at Wrangbrook, Llanishen, near Cardiff, in the county of Glamorgan, England, have invented certain new and useful Improvements in and Relating to Insulators and Insulating Conduits or Tubing for Electrical Purposes, of which the following is a specification, reference being had to the accompanying drawings.

My invention relates to insulators and insulating conduits or tubing for electrical purposes.

My improved insulators are chiefly intended for carrying telephone and telegraph wires, but they, as well as the conduits, are well adapted for carrying conductors through which high-voltage currents are intended to be conveyed.

Referring to the accompanying drawings, Figure 1 is a central longitudinal section of an insulator constructed according to my invention. Fig. 2 is a similar section illustrating a modification hereinafter described. Fig. 3 is a side view of a further modified form of my insulator. Fig. 4 is a section of another form of my improved insulator suitable for supporting secondary batteries. Fig. 5 is a transverse section illustrating an intermediate stage in the manufacture of my improved double conduit. Fig. 6 is a section illustrating a later stage in the manufacture of my improved conduit. Fig. 7 is a section of another double conduit made according to my invention.

Like letters denote corresponding parts in the several figures.

My improved insulator comprises a shell A, composed of natural fibrous silicates of iron magnesium and aluminium or any of them commonly called "asbestos" or composed of manufactured silicates commonly known as "slag-wool," formed into the desired shape by molding or weaving or otherwise and impregnated thoroughly with a non-conducting cement having, for example, the following composition, viz: sulfur, twenty-one parts; bitumen, ten parts; sulfate of barium, thirty-seven parts, and silica thirty-two parts.

In some cases it will be found practicable to omit the bitumen and also to largely reduce the quantity of sulfur present or even to entirely dispense with the sulfur, but in the latter case the bitumen should not be omitted. I sometimes also increase the proportions of sulfur and bitumen. The sulfate of barium may in some instances be substituted by silica or silicate fiber or be substituted by other salts having no water of crystallization, and the proportions may be varied to suit special requirements. I sometimes incorporate with the cement a small proportion of india-rubber or gutta-percha. The said shell A, formed of the silicate and impregnated with the cement, is filled with a non-conducting composition or cement B, similar to that used for impregnating the shell. Sometimes the shell and interior filling are cast together into the required shape. The shell is then fitted with a spike or spindle C, which is fixed in position by being embedded in the composition contained in the shell while the said composition is in a plastic condition, or a screw-thread may be formed in the cement, into which the spike may be screwed, or the spike may be cemented in in the usual way after the insulator has been formed.

The spike may, if desired, be insulated by silicate fiber which is plaited on it and which is impregnated with non-conducting cement.

One or more tubes D, of the same material as the shell or of enameled iron, may be inserted in the cement, as shown, to increase the distance measured along the surface of the non-conducting material between the spike or spindle and the shell so as to overcome the leakage caused by moisture. The tubular part or parts D may be formed integrally with the shell.

The outside of the shell A and tube D may be burnished smooth or may be coated with a suitable non-conducting lacquer, such as Japan lacquer or gum-varnish.

In some instances in lieu of varnishing the finished article I incorporate a small quantity of lacquer or varnish or glue from which the water has been expelled with the compound in which the shell is soaked.

I find that for carrying heavy conductors my insulator is made more effective if a thin ring of iron or steel F, Fig. 2, having the shape of the inside of the neck of the shell and covered either wholly or in part by the natural or manufactured silicates hereinbefore referred to, be introduced into the shell to form a support therefor. The said ring may have perforations in it to allow the cement to enter and thereby hold the ring more securely in position. In some instances I provide the ring F with two arms G, that project through the shell, as shown. The conductor J is placed between the said arms and is secured by means of a bolt or screw H, which passes through the arms, as shown.

The clip formed by the arms G and bolt H is insulated by the fibrous silicates above referred to. After the bolt or screw has been tightened up to secure the conductor it is insulated by hot cement applied to it. The cement may, if desired, be strengthened by having a little of the silicate fiber embedded in it.

I also make an insulator according to my invention by covering an iron or steel spike or spindle of the desired form with the silicates above referred to, the same being more or less tightly plaited or wound on such spike or spindle and then thoroughly impregnated with the aforesaid non-conducting cement or composition. Such an insulator is shown in Fig. 3. The spike or spindle C is in this instance bifurcated at the end to form a clip for holding the conductor. H is a pinching screw or bolt for tightening the clip. K is the insulating silicate fiber impregnated with the insulating cement or composition. For greater security an increased thickness of fiber may be applied to the part of the clip which comes in contact with the conductor.

In order to lessen the danger of leakage due to the presence of a continuous film of moisture, I fix on such insulator at intervals disks or curved shields L made of the same material as the covering of the spike.

Fig. 4 shows a form of insulator specially suitable for supporting secondary batteries. It comprises a shell A and an inner tube E, made of the fibrous silicate above referred to, impregnated with the non-conducting cement, and filled with cement B, such as that above described with reference to Fig. 1. The tube E forms a support or foot for the insulator. A' A' are recesses that are advantageous should this form of insulator be required for carrying conductors.

My insulating single or double conduits or tubes are made from sheets of the natural silicates above referred to, which sheets may be woven, or plaited, or knitted, or from sheets made of manufactured silicates, such as slag-wool, or from tubes which have been prepared by weaving, plaiting, or knitting the carded and spun fibers of such materials, or by pressing or rolling the dehydrated fiber between suitable dies or rolls into the required shape, or by molding, the material in all cases being thoroughly impregnated with the non-conducting cement above described. The impregnation is conducted at a temperature sufficiently high to render the cement plastic enough for the process, and in the case of the tubes greased or heated mandrels are placed in them to preserve their shape during the process of impregnation. When sheets N are used for making double conduits, they are rolled while hot to the shape shown in Fig. 5—that is to say, each sheet has two channels N' N' formed in it. Greased mandrels M are then placed in the said channels and the sides of the sheet are then pressed down, as indicated in Fig. 6. A hot roll is finally passed over the junction of the two edges in order to securely seal the edges. The mandrels are then removed.

In some instances I use in combination with the impregnated silicate fiber tubes a sheetmetal covering or a covering of asbestos paper impregnated with a hard non-inflammable cement, which covering may be applied to the silicate and the two then rolled together to form the conduit, as above described, the metal or impregnated paper, as the case may be, being outermost.

I sometimes find it advisable to cover the tubes outside or both inside and outside with lacquer varnish.

The aforesaid insulating material may be used for insulating wire conductors, the conductor being tightly rolled in with the same, or the fibrous yarn may be plaited or rolled onto the conductor and then impregnated with the non-conducting cement hereinbefore described.

I also make double conduits by taking a tube of woven, plaited, or knitted silicate fiber and sewing the same up the center with silicate fiber in order to form two tubes of equal size, as indicated in Fig. 7. I then insert mandrels in the tubes and impregnate the silicate fiber with the non-conducting cement. This form may also be made by molding or by pressing the impregnated dehydrated fiber with suitable dies.

Mandrels are placed within the tubes in order to preserve the shape of the tubes during the impregnation. They are subsequently removed.

Multitubular conduits may be prepared by placing the required number of woven, knitted, or plaited silicate tubes impregnated with non-conducting cement within larger iron, earthenware, or wooden or other tubes at the required distance from each other, the spaces between them being filled with the non-conducting cement above described. Greased or heated mandrels in this case are also placed within the tubes in order that the shape may be retained during the process of manufacture. Multitubular conduits may also be made from dehydrated fiber, as described for the double conduit, by molding or otherwise.

For special work when a very high degree of insulation is required I prepare a cable as follows—that is to say, I take the metallic conductor and plait, weave, or knit onto it several (as many as are deemed necessary) layers of the silicate fiber, which is then impregnated with the non-conducting cement and, if desired, is protected with metal, wood, or porcelain, or other protective material. I also prepare a cable in the manner above described, and after having woven, plaited, or knitted around it the silicate fiber and impregnated the same I place it in a copper or iron tube which may be used as another conductor, this being again insulated in the same way, if desired, or copper wire may be wound round the outside of the first cable and then be insulated as before and protected with any suitable coating. By these means I form a concentric cable in which the external conductor may serve as the return. I find it very advantageous to protect the copper-wire conductors used in these tubes against any possible action of the sulfur by a coating of tin or other suitable material.

Connecting boxes and joints may be made in the manner above described by preparing tubes of silicate fiber of suitable size to fit the conduit-tube, a little of the non-conducting cement being used to close the joint by means of a soldering-iron, or the tubes may be mortised and joined together by a non-conducting cement. The material in the silicate fiber properly impregnated being of a plastic nature I am able to form tubes of any shape or size that may be required. Connecting-boxes may also be made by impregnating dehydrated fiber, as above described, and pressing or molding the same to the required shape.

I sometimes make my improved insulators and tubing by molding the material of which they are made, and in the case of the tubing I sometimes make it by extending the material through suitable dies while in a plastic condition.

What I claim is—

1. An electrical insulator consisting of silicates impregnated with the herein-described electrically-non-conducting cement, substantially as described.

2. An electrical insulator consisting of a shell made of silicates impregnated with the herein-described electrically-non-conducting cement, substantially as described.

3. An electrical insulator consisting of a shell made of silicates impregnated with the herein-described electrically-non-conducting cement, and filled with similar cement, substantially as described.

4. An electrical insulator consisting of a shell made of silicates impregnated with the herein-described electrically-non-conducting cement, and filled with similar cement, and an inner insulating-tube partially embedded in the cement, substantially as described.

5. An electrical insulator consisting of a shell made of silicates of iron, magnesium and aluminium impregnated with the herein-described electrically-non-conducting cement, and filled with similar cement and a spike for supporting the insulator, substantially as described.

6. An electrical insulator consisting of a shell made of silicates of iron, magnesium and aluminium impregnated with the herein-described electrically-non-conducting cement, and filled with similar cement, a ring such as F within the shell, and a spike for supporting the insulator, substantially as described.

7. An electrical insulator consisting of a shell made of silicates of iron, magnesium and aluminium impregnated with the herein-described electrically-non-conducting cement, and filled with similar cement, a ring such as F within the shell, arms such as G forming a clamp projecting from the ring through the shell to hold the conductor, and a spike for supporting the insulator, substantially as described.

In witness whereof I have hereunto set my hand this 19th day of September, 1896.

FREDERICK GWILYM TREHARNE.

Witnesses:
GEO. P. SULCHER,
WM. WATKINS.